Dec. 7, 1943.   E. W. SPARLING   2,336,196
STEREOSCOPIC SLIDE
Filed July 23, 1941
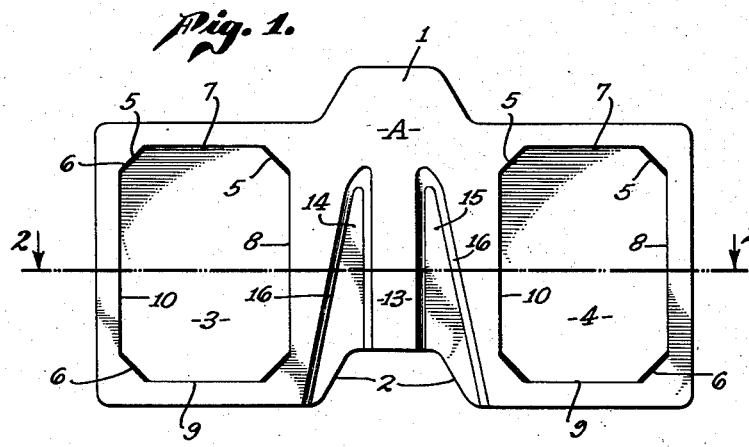
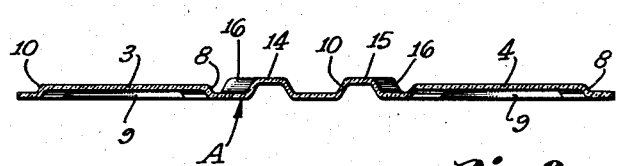
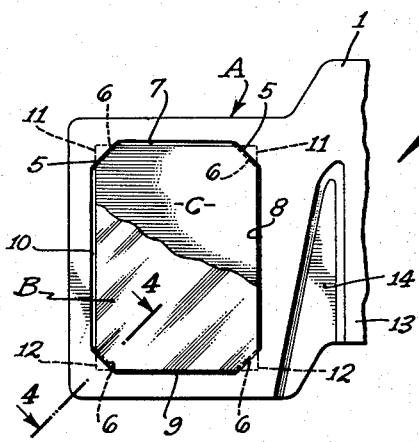
ELLIOTT W. SPARLING
INVENTOR
ATTORNEY.

Patented Dec. 7, 1943

2,336,196

UNITED STATES PATENT OFFICE 2,336,196

STEREOSCOPIC SLIDE

Elliott W. Sparling, Los Angeles, Calif., assignor to Stereo, Inc., Los Angeles, Calif., a corporation of California Application July 23, 1941, Serial No. 403,691

13 Claims. (Cl. 88—29)

This invention comprehends the provision of an improved slide for holding pictures adapted to be projected upon a screen as by means of a stereoscope or stereopticon ordinarily viewed in a stereoscope and has for a main object the provision of a slide formed of flexible transparent material such as Celluloid, plastic or other materials so that when molded into a desired shape the slide will be as thin as practicable and of such cross section as to possess a maximum of strength and durability, as well as being peculiarly formed for holding the pictures in position against displacement when the slide bodies are flexed.

The form of slide forming the subject matter of this invention is particularly adapted to stereoscopic purposes but may be used with equally good results in connection with stereopticon pictures. Heretofore slides for projecting pictures from stereopticons have usually been constructed with the pictures interposed and held between thin sheets of glass or Celluloid which required taping the margins of the slides so as to hold the picture and the two sheets of transparent material together for use, but in my improvements I provide a simple, economical and efficient means of supporting the pictures for projection which permits of the ready substitution of one picture for another, the omission of adhesives of any character, the elimination of the necessity for the use of a binding tape at the margins of the slide and, in addition, a slide which is unbreakable, as in the case of glass, is of a minimum thickness, and does not require a carrier for moving successive slides in a set into and from position in the projector for projecting pictures upon a screen.

An object, therefore, of this invention is to provide a slide, preferably but not necessarily, formed of a single piece of flexible transparent material, suitably reinforced for limiting the extent of flexibility and having one or more depressed areas in which the pictures are held against accidental displacement but permitting intentional removal as for the purpose of substitution of the pictures as may be desired.

Another object is to provide means for preventing the entrance of dust between the body of the slide, the picture and the retainer, and to so arrange the structure that the retainer is readily removable with or apart from the picture for any purpose.

Other objects may appear as the description progresses.

I have shown in the accompanying drawing a preferred embodiment of my invention, subject to modification, within the scope of the appended claims, without departing from the spirit of the invention. In said drawing:

Fig. 1 is a face view, in elevation, of a slide body embodying my improvements;

Fig. 2 is a sectional plan of the same on line 2—2 of Fig. 1;

Fig. 3 is a fragmentary view, similar to Fig. 1 except that a picture and a transparent retainer is shown in operative position; and Fig. 4 is a fragmentary section of the complete slide on line 4—4 of Fig. 3.

In said drawing I have illustrated, and will describe herein, a form of slide embodying my improvements which is particularly adapted for use in stereoscopes for projecting third dimension pictures, either in black and white or colors, but a slide constructed substantially in accordance with the form shown may be employed with equally good results in projecting single pictures as from stereopticons, as will be readily understood from the drawing and the description hereinafter following.

In its preferred form my improved slide includes a transparent body A formed of Celluloid, plastic or other suitable flexible material, one or more transparent retainers B for a similar or different material possessing the hereinbefore mentioned characteristics, and a corresponding number of positive pictures C preferably carried on photographic film and which are interposed between certain areas of the body A and said retainers. Of course when stereoscopic slides are used the pictures are positioned in spaced relation horizontally to correspond to the normal spacing of the eyes.

The body A is molded or pressed into the form shown in Figs. 1 and 2 from a single piece of transparent and flexible material and is preferably formed with a tab 1 at its top while the lower margin has a recess 2 corresponding in form to said tab so that the slide bodies may be formed from a continuous strip of material without appreciable loss, the tab of one section being formed from the recess of an adjacent section during the production operation.

The slide, therefore, is substantially rectangular and has a pair of depressed areas 3 and 4, each of rectangular form with the corner portions thereof formed at angles of approximately 45 degrees, as at 5 and slotted at 6 on the diagonal lines of the corners so that the pictures C and the retainers B may be held in the depressed areas 3 and 4 without danger of removal by accident.

The depth of the areas 3 and 4 is such as to substantially correspond to the combined thickness of the pictures C and the retainers B, and the dimensions of said pictures and retainers correspond to the length and width of the areas 3 and 4 so that when the pictures are held in position for projection the walls 7, 8, 9 and 10 of said areas will closely fit the edges of the pictures C, body A and retainers B at the margins.

Unlike the areas 3 and 4, however, the pictures C and retainers B are perfectly right angular at the corners thereof so that the corners of the same will be extended through the slots 6 of the body for a sufficient distance to insure against the accidental removal thereof from their positions of use in the slide. For instance, as seen in Fig. 3, the corners 11 of the picture C and the corners 12 of the retainer B are indicated by dotted lines as extended under the body A. (See also Fig. 4.)

Intermediate the picture areas 3 and 4 I provide a central area generally indicated at 13 which is suitably reinforced by a pair or more of ribs or areas which may have one or both edges slightly inclined as at 16 and of desirable width and cross section for preventing the undue flexing or distortion of the body, at least to the extent that the pictures and retainers are displaced from their seats in the areas 3 and 4. In this connection it may be noted that the form of the ribs 14 and 15 as shown in Fig. 1 is particularly adaptable for the purpose of the invention because the relatively angular relation of the margins of the ribs provides a greater rigidity than if the ribs had parallel margins. It is obvious, therefore, that if the body A were formed of a flat sheet of material with the slots 6 formed in the positions shown in Fig. 1 and the body was not reinforced properly the body would be capable of being bent into a loop to the extent that the pictures C and retainers B would be readily displaced therefrom.

It should be understood that slides constructed in accordance with my herein described improvements lend themselves readily and economically to use in the projection of color photographs from original positives for both stereoscopic and stereopticon pictures, and therefore require no hand coloring as in the case of ordinary slides. The walls of the depressed areas 3 and 4 also serve to additionally reinforce the body A and prevent the flexing of the body at local points in the vicinity of the pictures, and, together with the center ribs 14 and 15 the slides are reinforced both laterally and vertically to a sufficient extent to meet the purpose of the invention without too greatly reducing the flexibility or adding to the cost of the slides. Also, the outer surfaces of the retainers are substantially flush with the corresponding sides of the body.

Slides made in accordance with the disclosure hereof may be obviously used for direct viewing when they are inserted in a stereoscope.

What I claim, is:

1. A picture slide for the purpose described comprising: A body formed of flexible light transmitting material having a pair of ocularly spaced picture receiving areas depressed from the plane of the body, the marginal walls of said areas having slots therein, pictures seated in said areas, and light transmitting sheets also seated in said areas and overlying said pictures, corresponding portions of said pictures and said retainers extending through said slots for retaining the pictures in positions for use, the marginal walls of said areas providing reinforcing portions, and ribs formed intermediate said areas and cooperating with said marginal walls for preventing the flexure of the slide to an extent to cause the displacement of said pictures and said retainers.

2. A picture slide for the purpose described comprising: A body formed of flexible light transmitting material having a pair of ocularly spaced picture receiving areas of substantially rectangular form depressed from the plane of the body and provided with marginal slots at the corners thereof, pictures seated in said areas, and light transmitting sheets also seated in said areas and overlying said pictures, corresponding corner portions of said pictures and said retainers extending through said slots for retaining the pictures in positions for use, the depth of said depressed areas corresponding substantially to the combined thickness of the pictures and retainers.

3. A picture slide for the purpose described comprising: A body formed of flexible light transmitting material having a pair of ocularly spaced picture receiving areas of substantially rectangular form depressed from the plane of the body and provided with angularly disposed marginal slots at the corners of said areas, pictures seated in said areas, and light transmitting sheets also seated in said areas and overlying said pictures, corresponding corner portions of said pictures and said retainers extending through said slots for retaining the pictures in positions for use, and reinforcing ribs formed on said body intermediate said depressed areas.

4. A picture slide for the purpose described comprising: A body formed of flexible light transmitting material having a pair of ocularly spaced picture receiving areas depressed from the plane of the body and provided with marginal slots, pictures seated in said areas, and light transmitting sheets also seated in said areas and overlying said pictures, corresponding portions of said pictures and said retainers extending through said slots for retaining the pictures in positions for use, and reinforcing ribs formed on said body intermediate said depressed areas, said ribs having at least one of their marginal portions inclined relative to the other.

5. A stereoscopic slide comprising: A body formed of thin flexible and transparent material and provided with a pair of ocularly spaced picture receiving areas depressed from the plane of the body and having slots at the margins thereof for receiving and supporting pictures in position for viewing, pictures seated in said areas, light transmitting retaining elements overlying said pictures and also held in said areas, portions of said pictures and said retaining elements being engageable with said marginal slots for holding the pictures in position for use.

6. A stereoscopic slide comprising: A body formed of thin flexible and transparent material and provided with a pair of ocularly spaced picture receiving areas of substantially rectangular form depressed from the plane of the body and having slots at the corners thereof formed in the marginal walls of the areas for receiving the corresponding portions of and supporting pictures in position in said areas for viewing, pictures seated in said areas, retaining elements overlying said pictures and having corresponding portions engageable with said slots for holding the same and for confining the pictures in position for use, and means on said body intermediate said depressed areas for reinforcing the body against undue flexure which would tend to displace said pictures and retainers.

7. A steroscopic slide comprising: A body formed of thin flexible and transparent material and provided with a pair of ocularly spaced picture receiving areas depressed from the plane of the body and having means at the margins thereof for receiving and supporting pictures in position for viewing, pictures seated in said areas, retaining elements overlying said pictures and said retaining elements being engageable with said marginal means of said areas for holding the picture in position for use, marginal portions of said depressed areas forming reinforcement for said body to prevent the flexing of the body to an extent to displace said pictures and retainers, and reinforcing ribs on said body at points intermediate said depressed areas.

8. A stereoscopic slide comprising: A body formed of thin flexible and transparent material and provided with a pair of ocularly spaced picture receiving areas depressed from the plane of the body and having means at the margins thereof for receiving and supporting pictures in position for viewing, pictures seated in said areas, retaining elements overlying said pictures and said retaining elements being engageable with said marginal means of said areas for holding the picture in position for use, marginal portions of said depressed areas forming reinforcement for said body to prevent the flexing of the body to an extent to displace said pictures and retainers, and reinforcing ribs on said body at points intermediate said depressed areas, said ribs having angularly related margins whereby the tendency of the body to flex laterally or longitudinally is counteracted and undue distortion of the body is prevented.

9. A stereoscopic slide comprising: a body formed of a single piece of thin flexible light transmitting material and provided with a pair of ocularly spaced picture receiving areas depressed from the plane of the body, adjacent margins of said depressed areas having walls angularly disposed relative to the plane of the body and terminating short of junctions each with another, slots formed between adjacent extremities of said walls for receiving corners of pictures seated in said areas, the opposite margins of said depressed areas being parallel and said slots being diagonally disposed relative to the adjacent margins so as to support rectangular pictures in said areas when the corners of the pictures are extended through said slots.

10. A stereoscopic slide comprising: a body formed of a single piece of thin flexible light transmitting material and provided with a pair of ocularly spaced picture receiving areas depressed from the plane of the body, adjacent margins of said depressed areas having walls angularly disposed relative to the plane of the body and terminating short of junctions each with another, slots formed between adjacent extremities of said walls for receiving corners of pictures seated in said areas, the opposite margins of said depressed areas being parallel and said slots being diagonally disposed relative to the adjacent margins so as to support rectangular pictures in said areas when the corners of the pictures are extended through said slots, and light transmitting retaining elements adapted to overlie said pictures and having the corners thereof also held in said slots.

11. A stereoscopic slide comprising: a body formed of a single piece of thin flexible light transmitting material and provided with a pair of ocularly spaced picture receiving areas depressed from the plane of the body, adjacent margins of said depressed areas having walls angularly disposed relative to the plane of the body and terminating short of junctions each with another, slots formed between adjacent extremities of said walls for receiving corners of pictures seated in said areas, an edge of said body having a tab by means of which said slide may be inserted in and withdrawn from a stereoscope.

12. A stereoscope slide comprising: a body formed of a single piece of thin flexible light transmitting material and provided with a pair of ocularly spaced picture receiving areas depressed from the plane of the body, adjacent margins of said depressed areas having walls angularly disposed relative to the plane of the body and terminating short of junctions each with another, and slots formed between adjacent extremities of said walls for receiving corners of pictures seated in said areas, said body having ribs formed on a surface thereof and cooperating with the marginal portions of said depressed areas, for promoting the flexure of the body to an extent to dislodge said pictures.

13. A stereoscopic slide comprising: a body formed of a single piece of thin flexible light transmitting material and provided with a pair of ocularly spaced picture receiving areas depressed from the plane of the body, adjacent margins of said depressed areas having walls angularly disposed relative to the plane of the body and terminating short of junctions each with another, and slots formed between adjacent extremities of said walls for receiving corners of pictures seated in said areas, said body having ribs formed on a surface thereof and cooperating with the marginal portions of said depressed areas, for promoting the flexure of the body to an extent to dislodge said pictures, said ribs having certain margins disposed at angles which incline from adjacent margins of said depressed areas.

ELLIOTT W. SPARLING.